United States Patent
He

(10) Patent No.: US 10,161,430 B2
(45) Date of Patent: Dec. 25, 2018

(54) STABILIZED PANEL FASTENER

(71) Applicant: Penn Engineering & Manufacturing Corp., Danboro, PA (US)

(72) Inventor: Yi He, Jiangsu (CN)

( * ) Notice: Subject to any disclaimer, the term of this patent is extended or adjusted under 35 U.S.C. 154(b) by 0 days.

(21) Appl. No.: 14/661,822

(22) Filed: Mar. 18, 2015

(65) Prior Publication Data

US 2015/0267730 A1    Sep. 24, 2015

Related U.S. Application Data

(60) Provisional application No. 61/955,473, filed on Mar. 19, 2014.

(51) Int. Cl.
F16B 41/00    (2006.01)
F16B 5/02     (2006.01)

(52) U.S. Cl.
CPC .......... *F16B 5/0208* (2013.01); *F16B 41/002* (2013.01)

(58) Field of Classification Search
CPC ............................. F16B 5/0208; F16B 41/002
USPC .......................................... 411/325, 353, 999
See application file for complete search history.

(56) References Cited

U.S. PATENT DOCUMENTS

| | | | |
|---|---|---|---|
| 3,204,680 A | 9/1965 | Barry | |
| 3,560,132 A * | 2/1971 | Gulistan | F16B 35/00 29/512 |
| 3,724,150 A | 4/1973 | Hudnall | |
| 4,915,557 A * | 4/1990 | Stafford | F16B 5/0208 292/251 |
| 5,743,692 A * | 4/1998 | Schwarz | F16B 41/002 411/107 |
| 5,782,595 A * | 7/1998 | Schneider | F16B 5/025 411/107 |
| 6,467,990 B1 * | 10/2002 | Kremsler | F16B 5/02 403/408.1 |
| 6,644,903 B1 * | 11/2003 | Arand | F16B 5/0208 411/107 |
| 6,685,409 B2 * | 2/2004 | Braun | F16B 35/041 411/353 |
| 6,786,389 B2 | 9/2004 | Alden, III | |
| 8,113,755 B2 | 2/2012 | Wang | |
| 8,210,784 B2 * | 7/2012 | Hartmann | F16B 41/002 411/353 |

(Continued)

FOREIGN PATENT DOCUMENTS

EP    2644910    10/2013

OTHER PUBLICATIONS

Office Action from the State Intellectual Property Office of the People's Republic of China, dispatched Jan. 31, 2018.

(Continued)

*Primary Examiner* — Flemming Saether

(74) *Attorney, Agent, or Firm* — Ryder, Lu, Mazzeo & Konieczny LLC; Joseph M. Konieczny, Sr.; Gregory J. Gore

(57) ABSTRACT

A panel fastener includes a screw that is captivated to a ferrule and urged toward a retracted position by a spring which operates between the screw head and the ferrule. When the screw is in the retracted position, a collar of enlarged diameter on the screw occupies the area adjacent an internal annular captivation ring of the ferrule. The screw includes a flange that bears directly against the captivation ring providing a stop to prevent removal of the screw. The spring is preferably a coil spring that is operative against an outer flange of the ferrule.

7 Claims, 4 Drawing Sheets

(56) References Cited

U.S. PATENT DOCUMENTS

| | | | |
|---|---|---|---|
| 8,393,840 B2 * | 3/2013 | Chiu | F16B 5/0208 411/353 |
| 8,794,889 B2 * | 8/2014 | Aukzemas | F16B 5/0266 411/107 |
| 2002/0106258 A1 | 8/2002 | Braun et al. | |
| 2012/0189400 A1 * | 7/2012 | Chiu | F16B 5/0208 411/82 |
| 2012/0237316 A1 | 9/2012 | Chiu | |

OTHER PUBLICATIONS

Supplemental European Search Report, Application EP15764490, dated Oct. 2, 2017.

* cited by examiner

STABILIZED PANEL FASTENER

RELATED APPLICATION

This nonprovisional patent application claims the benefit of U.S. provisional application No. 61/955,473 entitled "Stabilized Panel Fastener" filed on Mar. 19, 2014, the contents of which are incorporated herein by reference.

FIELD OF THE INVENTION

The present invention relates to metallic captive panel fasteners. More specifically, it relates to captive panel fasteners that are utilized in a pick-and-place assembly process in the electronics industry.

BACKGROUND OF THE INVENTION

In the electronics industry, panel fasteners are often assembled to printed circuit boards by a robotic pick-and-place machine, which inserts the fastener into a circuit board receiving hole. This step is most usually done in conjunction with a surface mount soldering process. Even with the accuracy afforded by these machines, assembly errors can occur because the components of the panel fastener are only loosely joined.

Panel fasteners typically comprise a retractable and extendable screw that sits within a ferrule. The screw is held in the retracted position by a light coil spring operatively positioned around the screw shank between the screw head and the top of the ferrule. In the prior art, a large sidewall gap exists between the outer surface of the screw and the inner wall of the ferrule, which accommodates some misalignment between the circuit board and the structure to which it is affixed. The sidewall gap presents a problem however because it causes instability in handling the part by the pick-and-place machine. During assembly, the pick-and-place machine holds the fastener by the head of the screw and rapidly accelerates the fastener during assembly, which causes relative movement between the screw and the ferrule. This rapid movement during assembly can cause the ferrule to be misaligned with the circuit board receiving hole.

The aforementioned assembly problem, along with one proposed solution, is disclosed in U.S. Pat. No. 8,113,755, which discloses the use of a nut or an o-ring attached to the screw on the underside of the ferrule to hold the screw in a downwardly-compressed configuration such as shown in FIG. 1. This configuration eliminates movement between the screw and the ferrule. After the fastener is robotically assembled to the circuit board, the hold-down nut or o-ring is removed to allow the fastener to return to its normal retracted free state. This solution, however, has drawbacks including the additional cost of the nut or o-ring and the need to remove and dispose of those parts after circuit board assembly. Therefore, it would be desirable to provide a panel fastener and panel fastener assembling process that is less complicated and less expensive than the prior art, and can be used successfully with high-speed pick-and-place robotic assembly machines and methods.

SUMMARY OF THE INVENTION

The invention utilizes a strategy different from the prior art for achieving the desired result of fastener component stability. Rather than holding the fastener assembly compressed with the screw extended, stability is provided to the screw in its retracted free state. This function is achieved by employing a collar and a flange at the bottom of the screw shank just above the screw threads. These structures are utilized with a spring that is preferably stronger than the springs used in prior art panel fasteners. The collar is dimensioned to substantially close the gap between the screw and the ferrule but located only in the area of the ferrule captivation ring. It has been found that by adding this collar and using a stronger spring, sufficient stability is provided to meet the requirements of the high speed robotic assembly equipment. Because the collar is short and limited to the area around the captivation ring, misalignment compensation provided by the normally larger gap is still allowed after a very short extension of the screw. The stronger spring does not adversely affect the ease of manipulating the screw to any great extent.

More specifically, the invention provides a screw structure for a captive panel fastener comprising a screw having an enlarged head with means for applying a rotation thereto. A shank of the screw includes a neck portion of reduced diameter that extends downward immediately below the head, the neck being the smallest diameter of the screw. A short collar is located at the bottom of the end of the neck. A flange extends radially outwardly from the bottom of the collar. A threaded portion of the shank extends downward from the collar to a distal end of the screw.

In a panel fastener assembly, the screw is captivated to a ferrule and held in a retracted position by a spring that operates between the screw head and the ferrule. When the screw is in the retracted position the collar only occupies an axial area of the ferrule adjacent an internal annular captivation ring of the ferrule. The flange bears directly against the captivation ring providing a stop to prevent removal of the screw. The spring is preferably a coil spring that is operative against an outer flange of the ferrule.

Thus, the invention solves the intended objects to provide an inexpensive yet effective panel fastener, which has sufficient component stability to be successfully used with high speed assembly equipment.

DESCRIPTION OF PREFERRED EMBODIMENTS

Figure 1:
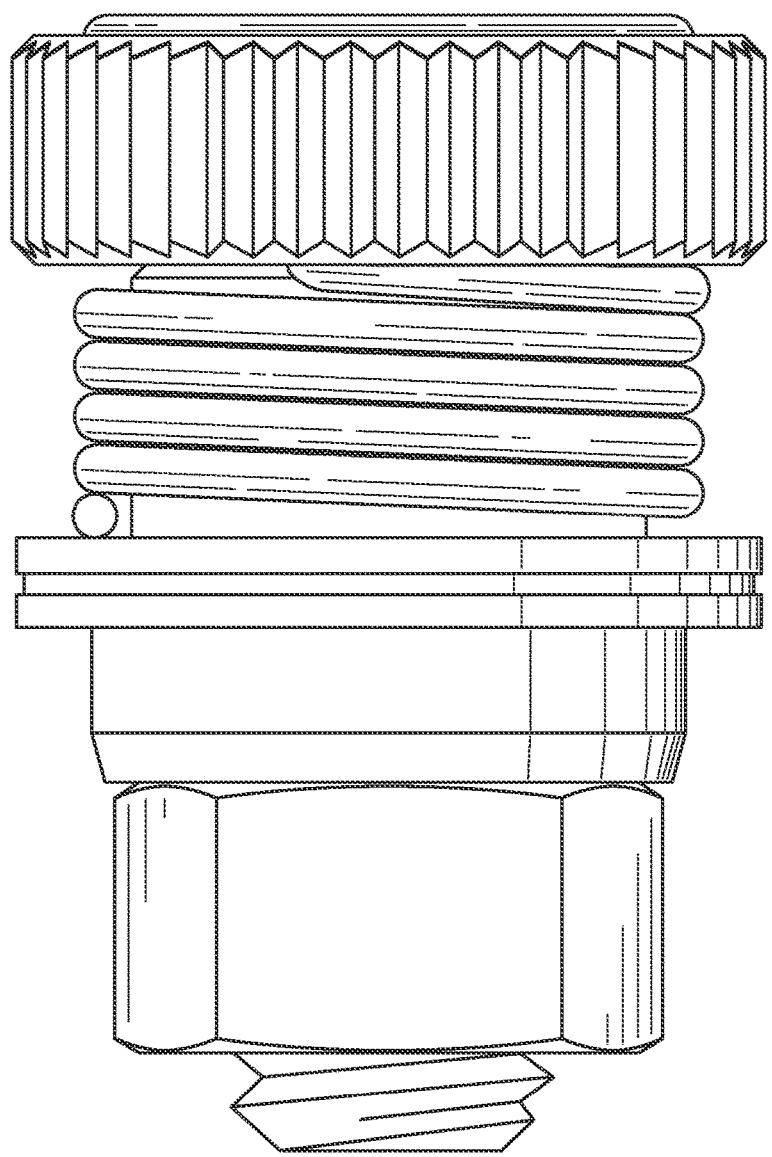
FIG. 1 is a front elevation of a prior art panel fastener.
Figure 2:
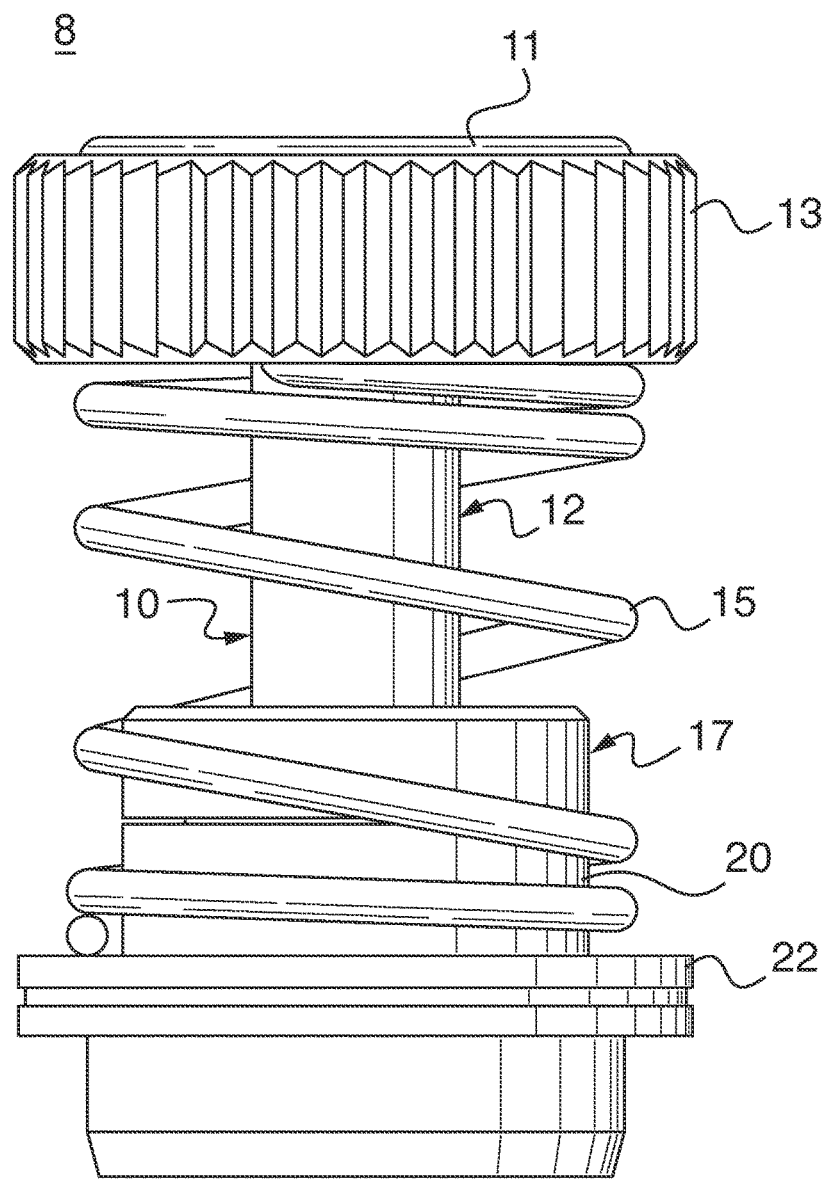
FIG. 2 is a front elevation of a panel fastener in accordance with a preferred embodiment of the invention.
Figure 3:
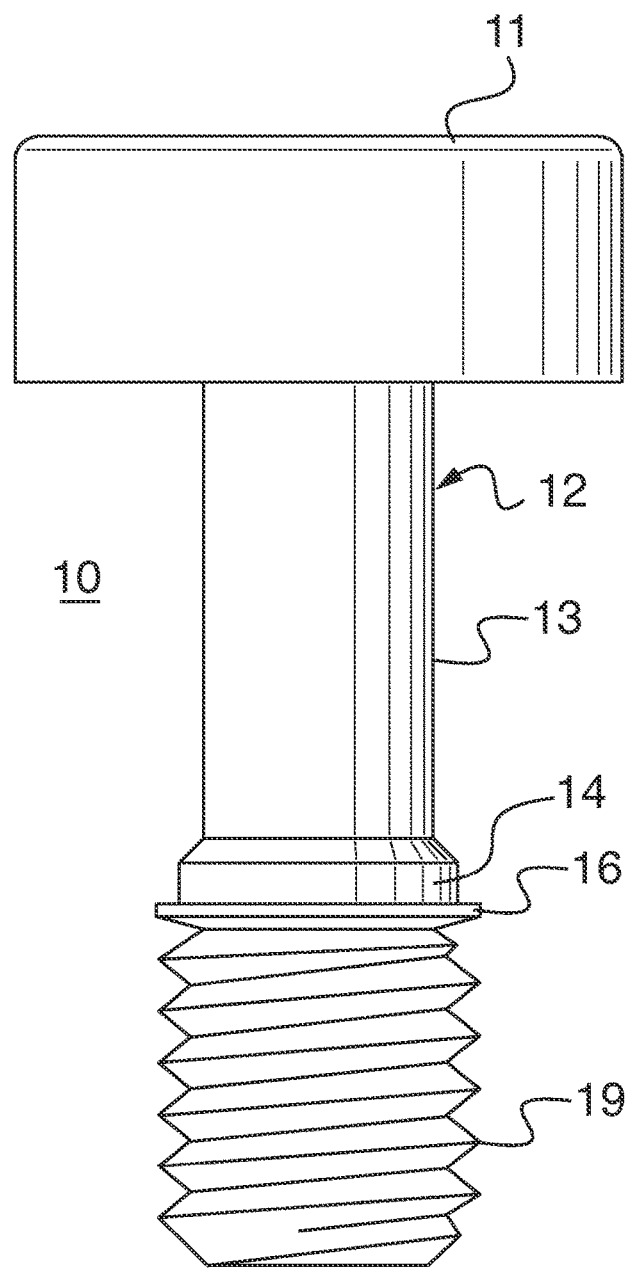
FIG. 3 is a front elevation of the screw of the fastener shown in FIG. 2; and,
FIG. 4 is a cross section of the fastener of FIG. 2.
Figure 4:
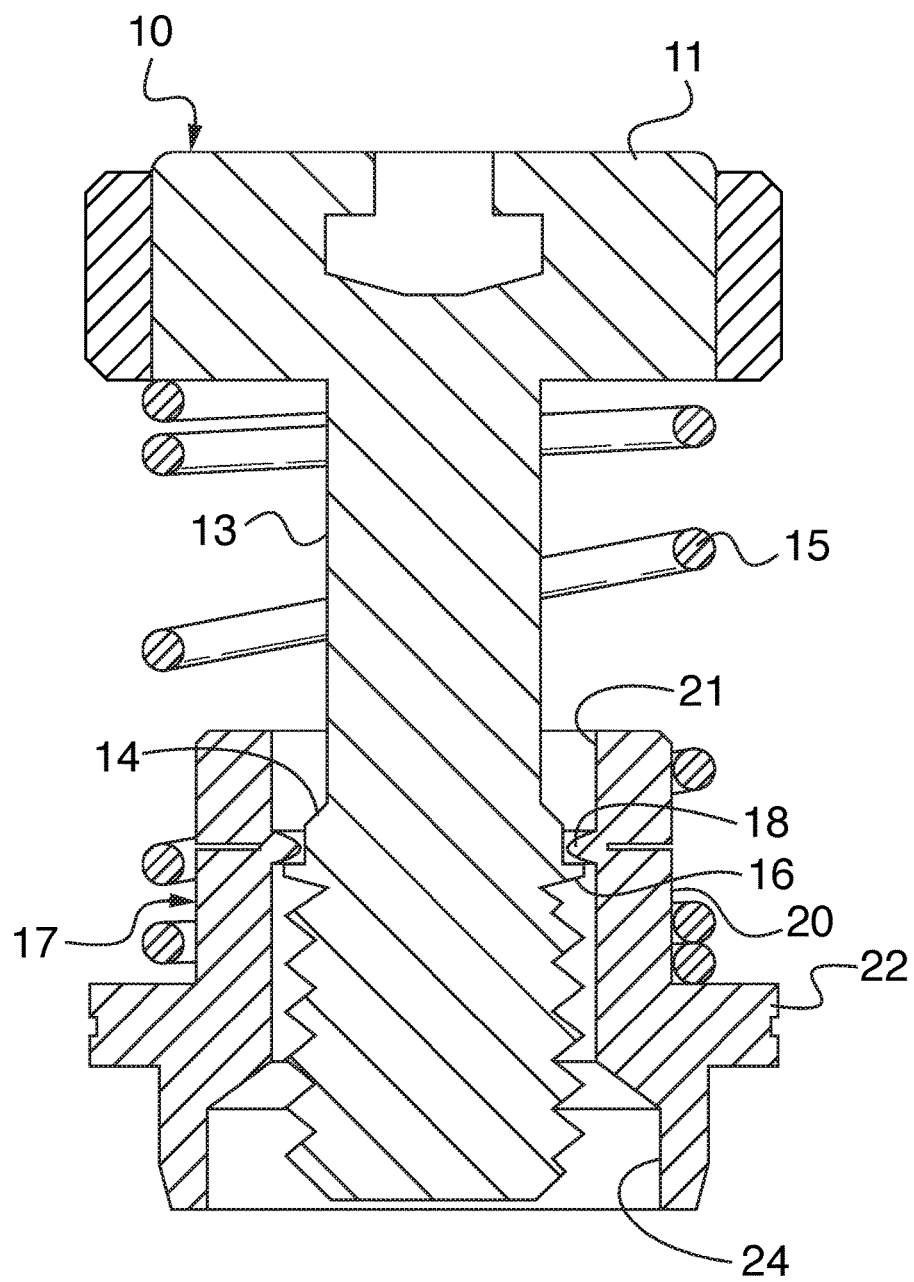

A panel fastener in accordance with a preferred embodiment of the invention is shown in FIGS. 2-4 and is designated generally by reference numeral 8. Referring to FIG. 2, the panel fastener 8 comprises an assembly of several components including a screw 10, a compression spring 15 and a ferrule 17. The screw 10 sits in the ferrule 17 and is held in a retracted position by a coil or compression spring 15, which is operatively positioned around the neck 13 of the shank 12 and ferrule 17.

The screw 10 generally comprises an enlarged head 11 and an elongate shank 12 fixed to and extending transverse to the plane of the head 11. In a preferred embodiment, the screw head 11 includes a grip 13 such as a plastic, over-molded covering, which assists manual gripping and turning of the screw 10. The grip 13 preferably has a knurled, serrated or textured outer annular surface.

Referring to FIG. 3, the shank 12 extends from a proximal end fixed to the enlarged head 11 to a threaded distal end. The shank 12 has generally discrete sections including a neck 13, a collar 14, and a flange 16 intermediate the head 11 and threads 19. With respect to the orientation shown in FIGS. 2-4, the neck 13, collar 14 and flange 16 are adjacently arranged below the head 11 but above the threads 19. In a preferred embodiment, the neck 13, collar 14 and flange 16 are integrally formed but may comprise separate elements in other embodiments. The threads 19 of the screw 10 extend downward from the flange 16 to its distal end (opposite the head).

The ferrule 11 has a generally-cylindrical base 20, an axial, internal bore 21, and a radial-extending shoulder 22 on the outer surface of the base 20. The internal bore 21 has a radially-increasing taper proximate the distal (relative to the screw head 11) end. An annular captivation ring 18 is fixed to and extends radially inwardly from the inner surface of the central bore 21 near the proximal (relative to the screw head 11) end. In a preferred embodiment, the captivation ring 18 is formed by radially crimping the ferrule inwardly at a predetermined axial location along the base 20. Alternatively, the captivation ring 18 could comprise a separate component inserted into the internal bore 21.

The compression spring 15 is operatively positioned around the neck 12 and the ferrule 17. One end of the spring 15 abuts the underside of the screw head 11 while the other end abuts a proximal (relative to the screw head) surface of the shoulder 22. The compression spring 15 holds the screw 10 in the retracted position shown in FIG. 2 with the screw head 11 extended away from the ferrule 17.

The screw 10 sits in and is captured by the ferrule 17. Referring to FIG. 4, a cross-section of a fully-assembled fastener is shown in its retracted free state. FIG. 4 also shows the location of the screw collar 14 within the bore 21 of the ferrule 17. The captivation ring 18 has an inner diameter that is smaller than the outer diameter of the annular flange 16. As a result, the outer flange 16 of the screw cannot translate within the inner bore past the captivation ring 18. Since the captivation ring 18 is located on the proximal side (relative to the screw head) of the outer flange 16, the captivation ring 18 retains the screw 10 within the ferrule 17 against the force of the spring 15.

The outer diameter of the collar 14 is greater than the neck 13 of the shank 12 but slightly smaller than the inner diameter of the captivation ring 18. Preferably, the collar 14 is dimensioned to provide the smallest possible gap between its outer surface and the captivation ring 18. The very small clearance between the captivation ring 18 and collar 14 snugly retains the screw and prevents the screw 10 from moving radially within the bore 21. The axial length of the collar 14 is relatively short compared to the length of the neck 13. Therefore, the collar 14 is configured in operative engagement with the captivation ring 18 when the screw 10 is retracted. In other words, the collar 14 and captivation ring 18 are only axially aligned over a short length of the shank 12. In a preferred embodiment, the compression spring 15 is stiffer than the spring of prior art panel fasteners. When the screw is extended, the threaded portion of the screw moves into a counterbore 24 in the bottom of the ferrule that is of larger diameter than the bore. This creates an enlarged sidewall gap between the screw threads and the ferrule sidewall which allows the screw to move farther laterally when extended. The narrowed neck and counterbore provide compensation for misalignment between the structures attached by the fastener.

With this combination it has been found that a mechanically stable relationship between the screw 10 and the ferrule 17 can be achieved that is sufficient to meet the requirements of high speed pick-and-place assembly machines and assembly methods. Compared to the prior art, applicant's construction needs no securing o-ring or hold-down nut; therefore, applicant's construction provides both labor and material cost savings. Thus, it will be apparent to those of skill in the art that the objects of the invention have been achieved.

The foregoing should be considered as illustrative of only embodiments of the invention. Further, since numerous modifications and changes will be readily apparent to those skilled in the art, it is not desired to limit the invention to the exact construction and operation shown and described herein. According, all suitable modifications and equivalents may be resorted to, all falling within the scope of the invention, which should be determined only by the following claims and their legal equivalents.

What is claimed is:

1. A panel fastener, comprising:
a) a screw having an enlarged head with means for applying a rotational force thereto and a shank extending transverse from said head, said shank having from top to bottom:
   i) a neck with an outer diameter;
   ii) a collar extending axially from said neck and having a diameter greater than said neck;
   iii) a flange fixed to and extending radially outwardly from a base portion of said collar, said flange having a diameter greater than the diameter of the collar; and
   iv) a threaded portion extending axially from the flange to a distal end of the screw wherein said collar and said flange are formed integrally together with the screw;
b) a ferrule surrounding a portion of the screw and having internal captivation means for preventing removal of the screw from the ferrule, said screw being slideable within a bore of the ferrule between retracted and extended positions, the bore extending below the captivation means;
c) a spring operatively positioned between the screw head and the ferrule for biasing the screw toward the retracted position; and
d) wherein the screw collar lies axially adjacent the ferrule captivation means in the radial direction when the screw is in the retracted position but not when the screw is in the extended position, the screw and ferrule arranged such that the smallest radial gap between the screw and the ferrule is increased a predetermined operative amount obtained by selection of the neck and collar diameters when the screw is in the extended position compared to the retracted position, such that the screw can move laterally to compensate for radial misalignment between the ferrule and attachable structures;
e) wherein the ferrule has a counterbore at a bottom of greater diameter than the bore such that said counterbore provides an increased radial gap between the collar and the ferrule in the extended position thus allowing the screw to move farther laterally within the ferrule in the extended position compared to the retracted position.

2. The panel fastener of claim 1 wherein the spring is a coil spring.

3. The panel fastener of claim 2 wherein the ferrule includes an external flange around a base of the ferrule.

4. The panel fastener of claim 3 wherein the spring bears directly against said external flange.

5. The panel fastener of claim 4 wherein the captivation means is an annular ring within the ferrule providing a region of reduced internal diameter of the ferrule.

6. The panel fastener of claim 5 wherein the screw flange bears directly against the captivation ring when the screw is in the retracted position.

7. The panel fastener of claim 1 wherein the axial length of the collar is relatively short compared to the length of the neck.

\* \* \* \* \*